United States Patent Office 2,986,926
Patented June 6, 1961

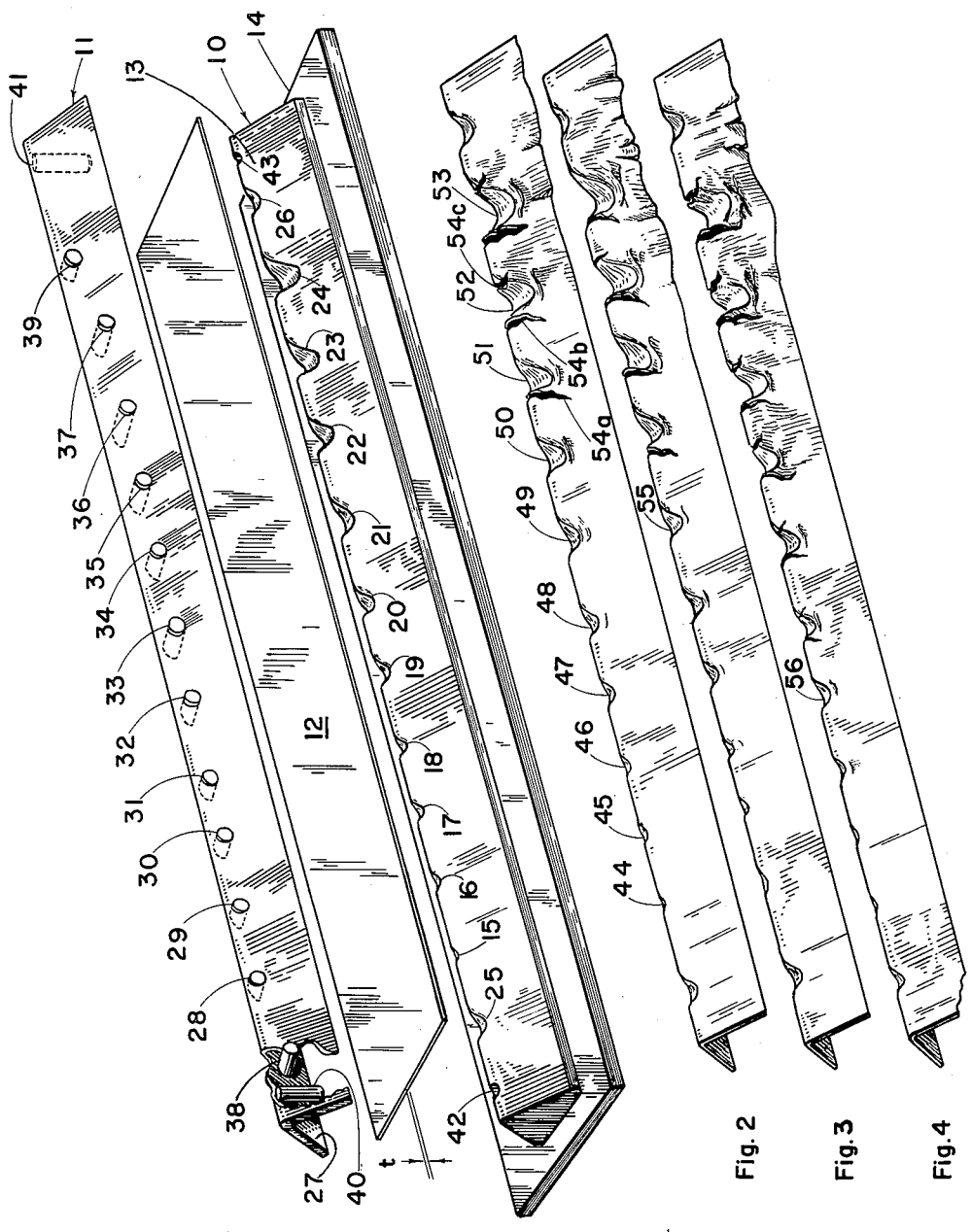

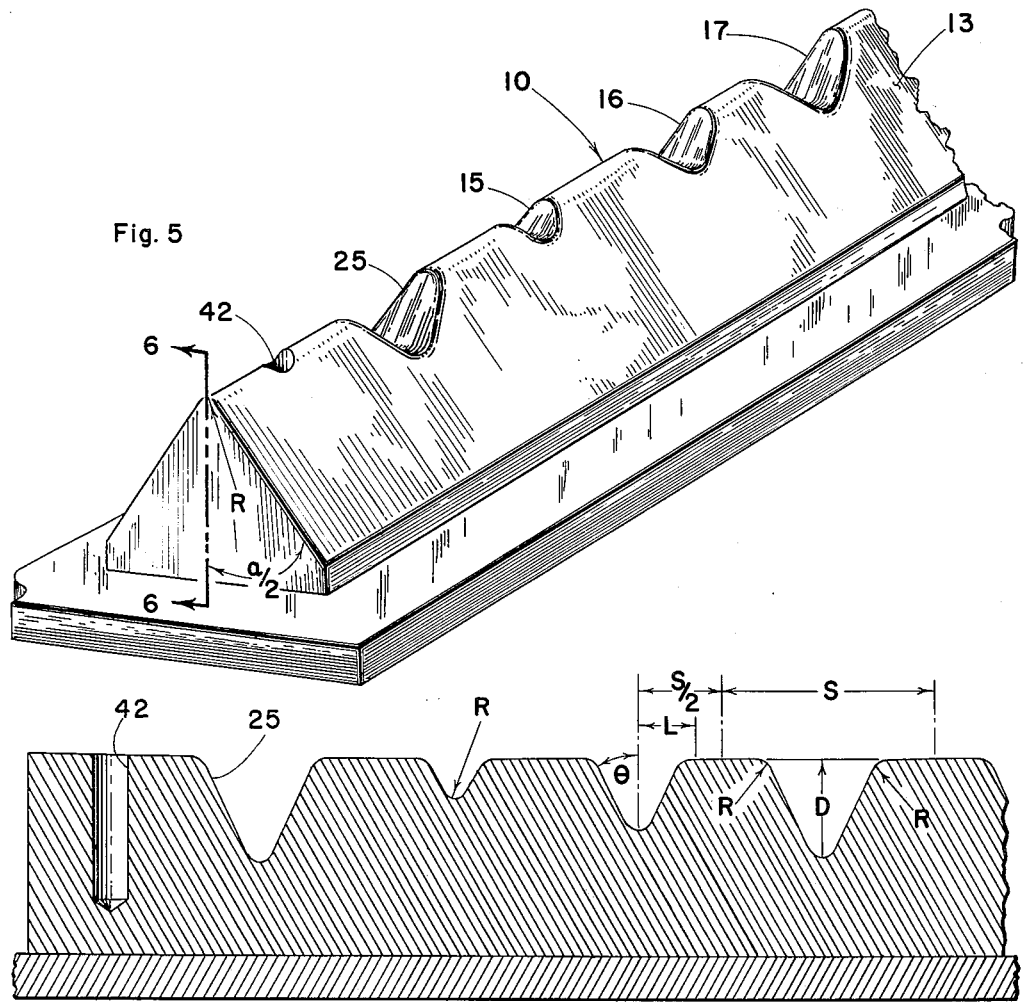
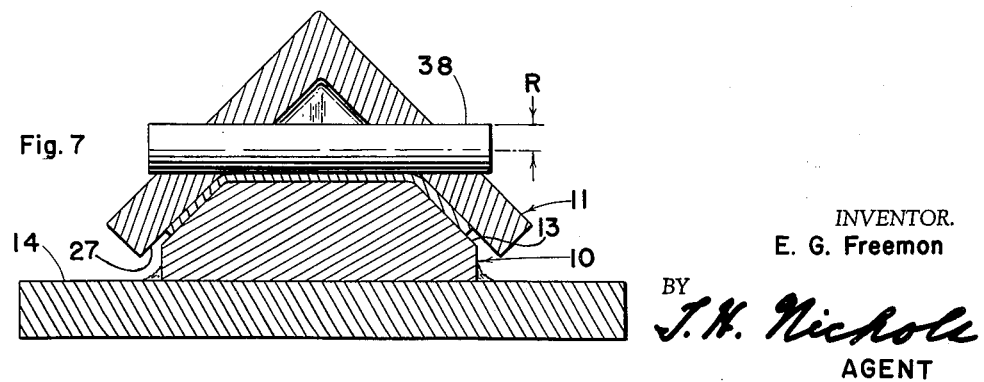

2,986,926
METHOD AND DEVICE FOR DETERMINING SURFACE ELONGATION OF SHEET MATERIAL
Eugene G. Freemon, Dallas, Tex., assignor to Chance Vought Corporation, a corporation of Delaware
Filed Feb. 16, 1959, Ser. No. 793,374
9 Claims. (Cl. 73—87)

This invention pertains to a method and device for testing and determining the surface elongation of a sheet of material.

More specifically, this invention comprises a new method for testing and determining the surface elongation of a sheet of material, particularly for determining whether the sheet can be drawn or formed without rupture, and at least one novel device in the form of a pair of matching dies for carrying out the new method.

Many difficulties have been experienced in the past with various sheet stock and particularly with titanium sheet stock which had been checked with conventional surface hardness gauges as meeting prescribed specifications but from which individual sheets were found to have had a surface hardness above normal or above what was prescribed. These sheets cracked during the forming, resulting in considerable loss of expensive material. It became obvious that closer qualification checking was necessary, at least one check on each sheet of material before forming.

Herebefore, the conventional Erichsen type of cup tester was the best type of testing device known for checking the strain resistance of sheet material. The cup tester has two principal defects which are obviated by the disclosed invention. (1) the cup testing results are only arbitrary values since there is no method known for indexing the results to a scale, and (2) the results of the cup testing cannot be evaluated for any specified directional surface strength, i.e., across the grain or with the grain because the cup tester produces a non-directional circular impression.

All prior means of testing elongation require precision shaped specimens and introduce inaccuracies due to variations in degree of precision of fabrication of the specimen.

Accordingly, a principal object of this invention is to provide a method and at least one device for accurately, quickly, and economically testing and determining the amount of surface elongation of sheet material by providing the surface elongation as a measured function without any physical measurement requirements and calculation.

Another object of this invention is to provide a method and at least one device for determining whether a sheet of material can be drawn or formed without rupturing and for providing the mean elongation of the sheet without the requirement of rigidly controlled size, measurement, or calculation of a specimen at a fraction of the labor costs of conventional testing by simultaneously elongating a plurality of portions of a sheet of material, each portion having applied thereto a predetermined strain to cause a precalculated surface elongation greater than the elongation of the preceding portion.

A still further object of this invention is to provide a method for verifying the surface elongation of a sheet of material comprising applying a predetermined strain to cause a precalculated surface elongation to a portion of the sheet and simultaneously applying a higher predetermined strain to cause a higher precalculated surface elongation to another portion of the sheet whereby verification of the elongation of the sheet is indicated by fracture of only the second portion of the sheet.

A further object of this invention is to provide at least one device in the form of a pair of matching dies having grooves to produce particular percentages of elongation in each groove for determining the surface elongation of a sheet of material to be drawn or formed.

Other objects and various advantages of the disclosed method and at least one device for determining surface elongation of sheet material will be apparent from the following detailed description together with the accompanying drawings, submitted for purposes of illustration only and not intended to define the scope of the invention, reference being had for that purpose to the subjoined claims.

Briefly, this invention comprises a new method and at least one device for carrying out the method for testing surface elongation of sheet material for determining whether each sheet can be drawn or formed without rupturing comprising a set of matched plate dies for testing a coupon, i.e., a small strip of metal cut off of each sheet, the male die being an elongated triangular projecting section of metal or plastic with varying depth grooves, and the female die being an elongated inverted V-shaped, channel die having transverse pins which force the sheet material down into the grooves, each pin being lower than the next adjacent pin whereby a greater amount of elongation of the material is produced by each succeeding pin. A formula has been worked out whereby the matching pins and grooves are designed in the dies to produce particular percentages of elongation as 4%, 5%, 6%, 7%, etc. This testing device could be used by anyone who performs drawing or forming operations of sheet material, as sheet metal for example. While the present testing equipment, the "Olsen" or the "Erichsen" cup testers, provide only empirical results, the instant device provides surface elongation as a measured function without any physical measurement requirements or calculation, provides directional surface strength, i.e., across the grain or with the grain, and provides approximate means of elongation at a fraction of the labor cost of conventional testing, without the requirement of rigidly controlled size, measurement, or calculation of the specimen.

The drawings diagrammatically illustrate by way of example, not by way of limitation, one form of the invention wherein like reference numerals designate corresponding parts in the several views in which:

FIGURE 1 is a perspective view of a pair of matching dies with a small strip of sheet material positioned therebetween prior to mating of the dies;

FIGS. 2, 3, and 4 are perspective views of three coupons, each possessing a different amount of surface elongation;

FIG. 5 is a perspective view of an end portion of the male die illustrating an aligning hole, a material holding groove, and the three elongating grooves therein;

FIG. 6 is a longitudinal cross-sectional view taken at 6—6 on FIG. 5; and

FIG. 7 is a cross-sectional view of a sheet of material between the dies of FIG. 1 during mating under pressure.

This invention disclosed herein is not limited in its application to the method, details of construction, and arrangement of parts shown and described, since the invention is capable of other embodiments and of being practiced or carried out in various other ways. Also it is to be understood that the phraseology or terminology employed herein is for the purpose of description and not of limitation.

When forming or drawing parts from a large sheet of material, either metal, plastic, or the like, and particularly from an expensive material such as titanium, it is usually desired to know with a high degree of reliability whether parts from each sheet will form without rupturing. Accordingly the disclosed method of testing surface elongation has been developed to provide an easy and accurate directionalized surface elongation of a coupon or small strip of sample material cut from each large sheet of material.

This method may be used for determining the surface elongation of practically any sheet material, metal or otherwise. The only known sheet materials on which this method cannot be utilized are those brittle materials, such as beryllium, glass, or tungsten, that fracture upon application of any force or strain perpendicular to the face plane. Exemplary or typical metals and alloys that have been checked extensively by this method are the aluminum alloys 20240, 5052–0, 6062–0, 7075–0, and 7075–T6; the magnesium alloys FS 1–0 and HK 24; and the titanium alloys AMS 4901 and AMS 4908.

The disclosed method of determining the surface elongation of a sheet of material comprises elongating small portions of the sheet material simultaneously through a range of definite numerical values, such as applying different amounts or percentages of surface elongations to the small portions, as applying directed strains in the range from one causing 4% of surface elongation in one portion of material to a strain causing 13% surface elongation in the last of ten portions. A typical range for typical titanium alloy sheets is from 9% to 18% surface elongation.

While various devices may be constructed to perform the above method a preferred apparatus comprises two inverted V-shaped, male and female matching dies, 10 and 11, illustrated in FIG. 1 for determining the surface elongation of a coupon 12 or test strip cut from a large sheet of sheet material.

For use with these dies, as shown in FIG. 1, the coupon may be trimmed off of a sheet at any time prior to forming or drawing of parts from the sheet and the surface elongation determined by positioning it between the two matching dies 10 and 11 and mating the dies under pressure.

Male die 10 comprises a solid die having an inverted V surface 13 and triangular section, and mounted on a suitable base 14. A series of grooves 15, 16, 17, 18, 19, 20, 21, 22, 23 and 24 are formed in the vertex or top edge of the die, each succeeding groove being of increased depth, for applying different strains to cause different amounts of surface elongation to different portions of the coupon. The vertex in the inverted V surface 13 is curved about a radius R, FIG. 5, and the radii of the three curves in each groove as shown in FIG. 6 are each equal to R. Exemplary percentages of elongation on ten portions of a coupon of sheet material produced by the set of grooves 15, 16, 17, 18, 19, 20, 21, 22, 23, and 24 are 4%, 5%, 6%, 7%, 8%, 9%, 10%, 11%, 12%, and 13%, respectively. Obviously if so desired, the grooves may be designed to cause other percentages of elongations.

The formula for determining the surface elongation of the material parallel to the corner with the use of the disclosed set of dies and particularly in reference to the male die as shown in FIG. 6 is derived by the method of superposition, using incremental elements of elongation for each distinct element of the bead, i.e., the transverse and longitudinal components were combined by using the inelastic Poisson's ratio as an algebraic operator. The percentage of elongation produced parallel to the axis of forming the corner that is due to corner bead forming is represented by:

$$\frac{1}{S}\left[(R+t)\left\{\left(\frac{\pi\theta}{180}-\sin\theta\right)+(1-\sin\theta)(\sec\theta-\tan\theta)\right.\right.$$

$$+\sin\theta\mu\left(\frac{t}{2R+t}\right)\right\}+R\left\{\sin\theta\mu\left(\frac{t}{2R+t}\right)\right.$$

$$+(1-\sin\theta)(\sec\theta-\tan\theta)\right\}+D\left\{(\sec\theta-\tan\theta)\right.$$

$$+\mu\left(\tan\frac{\alpha}{2}-\sec\frac{\alpha}{2}\right)+\left(\frac{S}{2}-L\right)\left(\frac{\mu t}{2R+t}\right)\right\}\right]$$

Accordingly the surface of each groove 15—26 in the male die 10 is described by the above equation where:

$L=\tan\theta\{D-(2R+t)(1-\cos\theta)\}+\sin\theta(2R+t)$
$R=$radius used in forming
$t=$thickness of sheet material
$\alpha=$the angle enclosed by the V surfaces of the male die
$\theta=\frac{1}{2}$ of the angle enclosed in the groove
$D=$depth of groove
$S=$minimum length of space required for a groove and space between two grooves
$L=\frac{1}{2}$ the length of the groove in the male die measured between the two extreme points of tangency of the end surfaces of the groove with a straight line lying on the vertex of the die extending over the grooves
$\mu=$Poisson's ratio for the material being tested A set of dies described by the above equation may be made with only one groove therein for forming a specific surface elongation. In that case, $S=2L(105\%)$.

The orientation of the cut of the coupon is determined by the direction of the maximum elongation required to form the part wherein the longitudinal axes of the dies are aligned with the direction of maximum elongation required to provide directionalized surface elongation.

Holding notches 25 and 26 are provided beyond the elongation determining grooves near the ends in the male die for preventing longitudinal movement of the coupon when being formed between the dies.

Female die 11 shown in FIGS. 1 and 7 has an inverted V surface 27 for matching with the inverted V surface 13 of male die 10 when the two dies are mated. The female die also carries a set of elongating projections or pins 28, 29, 30, 31, 32, 33, 34, 35, 36, and 37 projecting horizontally through the legs of the inverted V surface at various distances from the vertex of the V, the distance of each succeeding pin being increased. The arcuate surface of the inverted V surface 27 as well as that of each of pins 28 to 37 have a radius equal to R.

Holding projections or pins 38 and 39 are secured in the inverted V surface 27 of die 11 outboard of the set of elongating pins 28 to 37 so as to be in alignment with the holding notches 25 and 26, respectively, to prevent movement of the coupon when the two dies are mated.

Alignment pins 40 and 41 in the ends of female die 11 bisect the angle $\alpha$ of the die as well as project outwardly from the surface 27 of the die to tightly fit into aligning holes 42 and 43, respectively, in the male die 10 whereby as the two dies are mated under pressure with a coupon therebetween, the aligning pins guide the dies together to accordingly align each of the coupon holding pins with its matching notch and each of the elongating pins with its matching groove. Pin 41 and its mating hole 43 are preferably formed larger than the other aligning elements 40 and 42, respectively, as a non-reversible feature of the dies.

In operation of the disclosed device for carrying out the method of determining the surface elongation of a sheet of material, the two dies are mated under pressure with a coupon from the sheet material therebetween. Corner beads are formed in the coupon as a result of the mating together or cooperation between the grooves of one die and the projections of the other die, each bead being formed progressively deeper by the transverse pins 28 to 37 spaced at progressively increasing distances from the vertex of the female die fitting in the progressively deeper grooves 15 to 24, each groove of which produces 1% more elongation than the preceding groove in the disclosed exemplary embodiment. The groove having the highest amount of elongation that fails to fracture indicates the elongation of the sheet material being tested. The resultant coupon for one sheet of material is illustrated in FIG. 2 having corner beads 44 to 53 formed therein and in which fracture in the form of cracks 54a, 54b, 54c, etc., appeared in the last three corner beads 51, 52, and 53 whereby bead 50 was the highest unfractured bead to indicate a surface elongation of 10% for this sheet material.

In FIG. 3, the highest unfractured corner bead 55 indicates a surface elongation of 9% of that particular sheet, while the highest unfractured corner bead 56 of FIG. 4 indicates a surface elongation of only 7% for that sheet.

In summary a method has been disclosed for accurately providing the surface elongation as a measured function of a sheet of material comprising simultaneously elongating a plurality of portions of the sheet material by applying to each portion a predetermined surface elongation greater than the elongation applied to the preceding portion. While various mechanisms may be constructed to perform the method, a preferred device comprises two dies, one having grooves to allow a series of directed strains in movement varying by one percent, for example, and the other matching die having a set of matching transverse pins for forcing the portions of the material into immediate contact with the grooves. By applying the two dies to the sheet material, the directed strains produce surface elongation that vary directly with the depth and/or size of the grooves wherein those portions having the greater directed strain failed by cracking and/or fracturing, the surface elongation of the sheet material being indicated by the magnitude of the largest groove that did not fracture. Likewise, a method has been developed for verifying the surface elongation of a sheet of material comprising applying to a portion of the sheet a predetermined strain equal to the strain that would cause the designed surface elongation of the sheet and simultaneously applying a higher predetermined strain to another portion of the sheet whereby verification of the elongation of the sheet is indicated by fracture of only the second portion.

While some prior means for testing or determining surface elongation requires precision shaped specimens and introduce inaccuracies due to variations in degree of precision of fabrication of the specimen, the disclosed testing method and device require no such precision shaped specimen. Accordingly, a large increase in economy in time of testing results. Likewise, due to the ease of taking test specimens, duplicate specimens may be easily taken if so desired in providing accurate directionalized results.

While only a method and at least one novel embodiment for carrying out the method of the invention have been disclosed in the accompanying drawings, it will be evident that various modifications may be possible in the arrangement and construction of the disclosed invention without departing from the scope of the invention.

I claim:
1. A method for determining the surface elongation of a sheet of material comprising the steps of, applying a pre-determined strain to cause elongation of a portion of the sheet by a small amount comprising the lowest value in a range of predetermined percentages of surface elongation from a value well below the desired value to a value well above the desired value, and simultaneously applying a pre-determined strain to cause elongation of other portions of the sheet by increasing amounts wherein the percentage of elongation applied to each portion is greater than that elongation applied to the preceeding portion and wherein the greatest percentage of elongation applied comprises the highest value in said range whereby the percentage of elongation of the sheet material is indicated by the percentage of elongation of the last portion that fails to fracture.

2. A method for verifying the surface elongation of a sheet of material comprising the steps of applying a pre- determined strain to cause a precalculated surface elongation below a desired value to a portion of the sheet, simultaneously applying a predetermined strain higher than the desired value to cause a surface elongation to another portion of the sheet higher than said precalculated surface elongation whereby verification of the elongation of the sheet is indicated by fracture of only the second portion of the sheet.

3. A method for determining the surface elongation of a sheet of material comprising the steps of, applying to a portion of the sheet material a predetermined strain to cause a precalculated surface elongation that is lower than the expected surface elongation of the sheet, and simultaneously applying to other portions of the sheet higher predetermined strains to cause higher precalculated surface elongations, the highest predetermined surface elongation being higher than the expected surface elongation of the sheet whereby the surface elongation of the sheet is indicated by the elongation of the portion having the greatest predetermined surface elongation without fracturing.

4. A method for determining the surface elongation of a sheet of material in a particular direction relative to the direction of the grain of the material comprising the steps of, applying a predetermined strain in the particular direction to cause a precalculated increment of surface elongation to a portion of the sheet which surface elongation is equal to or less than the surface elongation of the sheet, and simultaneously applying predetermined strains in the same particular direction to cause a precalculated increment of surface elongation to other portions of the sheet, each portion having applied thereto a predetermined strain to cause a precalculated surface elongation greater than the surface elongation of the preceding portion.

5. A device for determining the surface elongation of a sheet of material comprising, a male die having an inverted V-shaped surface, a female die having an inverted V-shaped surface complementary with said male die surface, a plurality of grooves formed in the apex of the inverted V-shaped male die surface, each of the succeeding grooves being of increased depth, and a plurality of projections extending from the inverted V-shaped female die surface, the distance of each succeeding projection from the vertex of the female V surface being increased, so that upon mating said two dies together with the sheet material positioned between the dies each projection of said female die forces a portion of the sheet into a groove in said male die and contiguous with the surface of the groove, the surface of each of said succeeding grooves being formed to provide an increased predetermined increment of surface elongation in a range of surface elongations whereby the surface elongation of the sheet material is indicated by the elongation of the portion having the greatest predetermined increment of surface elongation without fracturing.

6. A device for verifying the surface elongation of a sheet of material comprising, a first die and a matching second die, said first die having a plurality of grooves therein, each of the succeeding grooves being of increased depth, said second die having a plurality of projections thereon, the distance of each succeeding projection from an edge of said second die being increased, whereby upon mating said two dies together with the sheet material therebetween each projection of said second die forces a portion of the sheet into a groove in said first die, the surface of one of said grooves being formed to provide a first predetermined surface elongation in a first portion of the sheet, said first predetermined surface elongation being that which the sheet is designed for, and the surface of a second groove being formed to cause a second predetermined surface elongation in a second portion of the sheet, said second predetermined surface elongation being greater than what the sheet is designed for whereby verification of the elongation of the sheet is indicated by fracture of only the second portion of the sheet.

7. A device for determining the surface elongation of a sheet of material comprising, a first elongated die and a matching second elongated die, said first die having a plurality of grooves therein, each of the succeeding grooves being of increased depth, said second die having a plurality of projections thereon, the distance of each succeeding projection from an edge of said second die being increased, whereby upon mating said two dies together with the sheet material therebetween each projection of said second die forces a portion of the sheet into a groove in said first die, the surface of one of said grooves being formed to cause a predetermined surface elongation, holding means on said dies to prevent longitudinal movement of the sheet, and aligning means on said dies for aligning said projections of said second die with said grooves of said first die.

8. A device as recited in claim 7 wherein said holding means comprises a groove on each end of said first die and a matching projection on each end of said second die whereby upon mating said two dies together with the sheet material therebetween, the material is fixedly secured at each end of the die.

9. A device as recited in claim 7 wherein said alignment means comprises an opening at each end of one of said dies for receiving a pin at each end of the other of said dies.

References Cited in the file of this patent

UNITED STATES PATENTS

| | | |
|---|---|---|
| Re. 14,421 | Erichsen | Jan. 8, 1918 |
| 1,371,050 | Olsen | Mar. 8, 1921 |
| 1,704,326 | Junkers | Mar. 5, 1929 |
| 2,541,974 | Wills | Feb. 13, 1951 |
| 2,801,540 | Rondeau | Aug. 6, 1957 |